US012585861B1

(12) United States Patent
Devadas et al.

(10) Patent No.: US 12,585,861 B1
(45) Date of Patent: Mar. 24, 2026

(54) ENABLING AUTOMATION OF WEB CONTENT AUTHORING WORKFLOW THROUGH GENAI

(71) Applicant: INTUIT INC., Mountain View, CA (US)

(72) Inventors: Namita Devadas, Bangalore (IN); Aprameya Dash, Bangalore (IN); Himanshu Ranjan, Bangalore (IN); Kumaran Sethu Gowthaman, Bangalore (IN); Nivedita Nayak, Bangalore (IN); Anil Sharma, Bangalore (IN); Gaurav Misra, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/287,129

(22) Filed: Jul. 31, 2025

(51) Int. Cl.
G06F 40/12 (2020.01)

(52) U.S. Cl.
CPC .................................... *G06F 40/12* (2020.01)

(58) Field of Classification Search
CPC ....................................................... G06F 40/12
See application file for complete search history.

(56) References Cited

U.S. PATENT DOCUMENTS

2025/0021309 A1* 1/2025 Schmidt ................... G06F 8/34
2025/0094143 A1* 3/2025 Huang ...................... G06F 8/38
2025/0244973 A1* 7/2025 Saragadam .............. G06F 8/35

* cited by examiner

*Primary Examiner* — Mahelet Shiberou
(74) *Attorney, Agent, or Firm* — DLA PIPER LLP US

(57) ABSTRACT

A computing system and method that receives design input from a source system, processes the design input using artificial intelligence to identify distinct components, generates standardized representations of the components, performs similarity analysis to match the components with existing templates from a database, extracts relevant data from the components and maps the data to appropriate schema structures, and converts the populated schemas into a format compatible with a target system. The automated process leverages machine learning models and multimodal analysis techniques to transform visual designs into functional content without manual intervention, improving efficiency and consistency in content creation workflows.

18 Claims, 8 Drawing Sheets

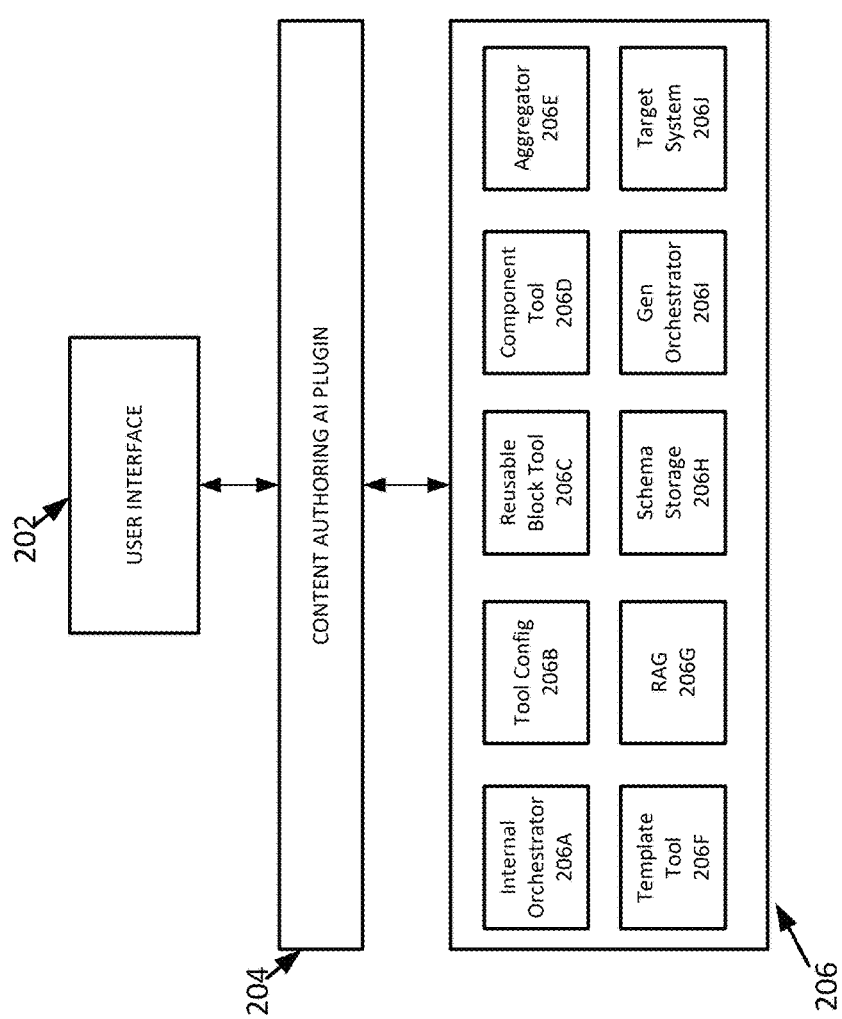
FIG. 2

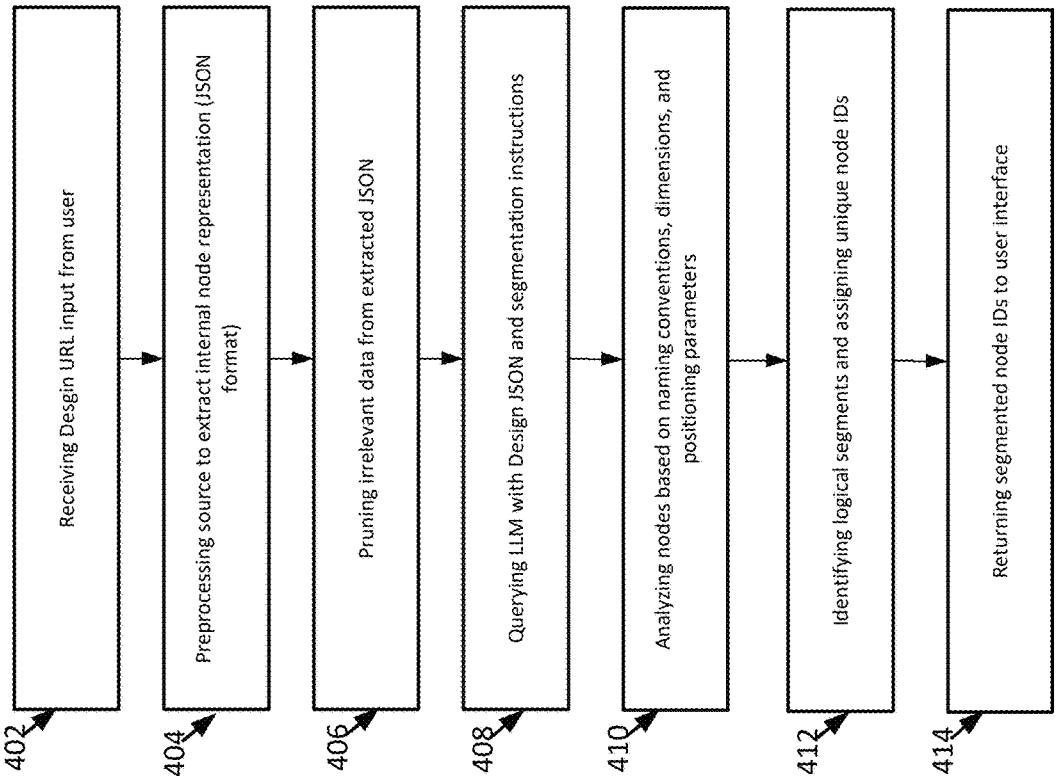

402 Receiving Desgin URL input from user

404 Preprocessing source to extract internal node representation (JSON format)

406 Pruning irrelevant data from extracted JSON

408 Querying LLM with Design JSON and segmentation instructions

410 Analyzing nodes based on naming conventions, dimensions, and positioning parameters 412 Identifying logical segments and assigning unique node IDs 414 Returning segmented node IDs to user interface

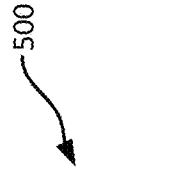

500

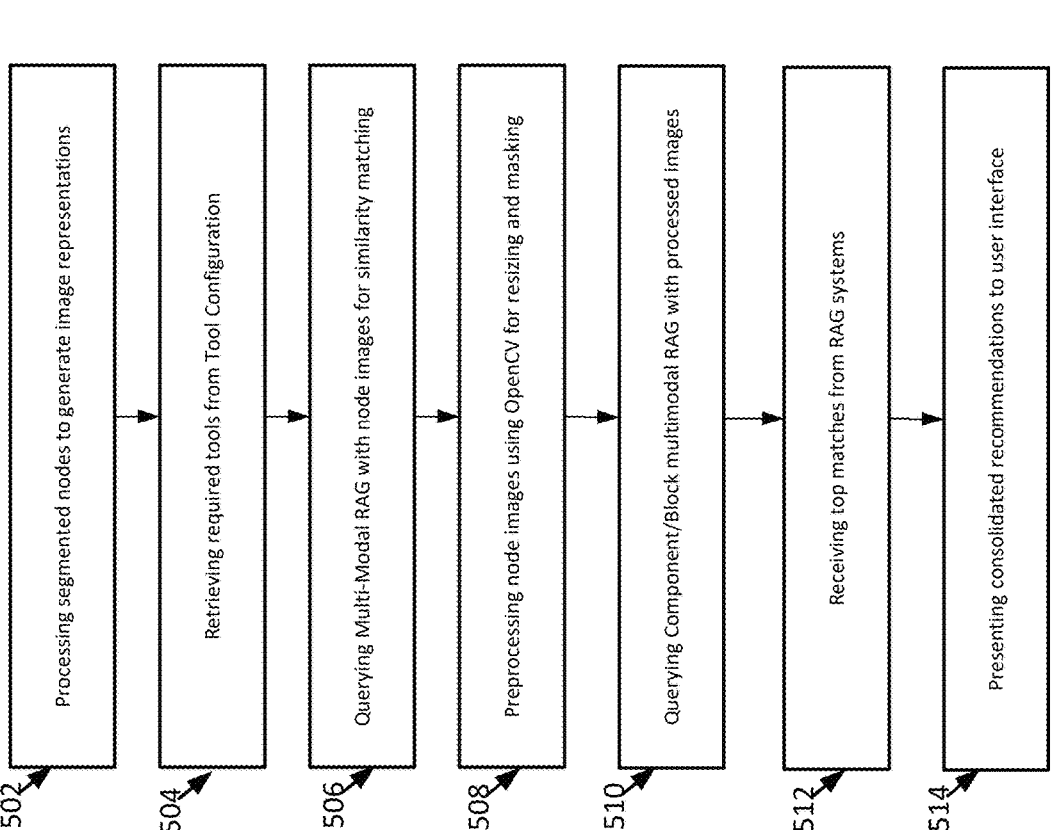

502  Processing segmented nodes to generate image representations

504  Retrieving required tools from Tool Configuration

506  Querying Multi-Modal RAG with node images for similarity matching

508  Preprocessing node images using OpenCV for resizing and masking

510  Querying Component/Block multimodal RAG with processed images

512  Receiving top matches from RAG systems

514  Presenting consolidated recommendations to user interface

FIG. 5

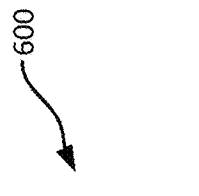

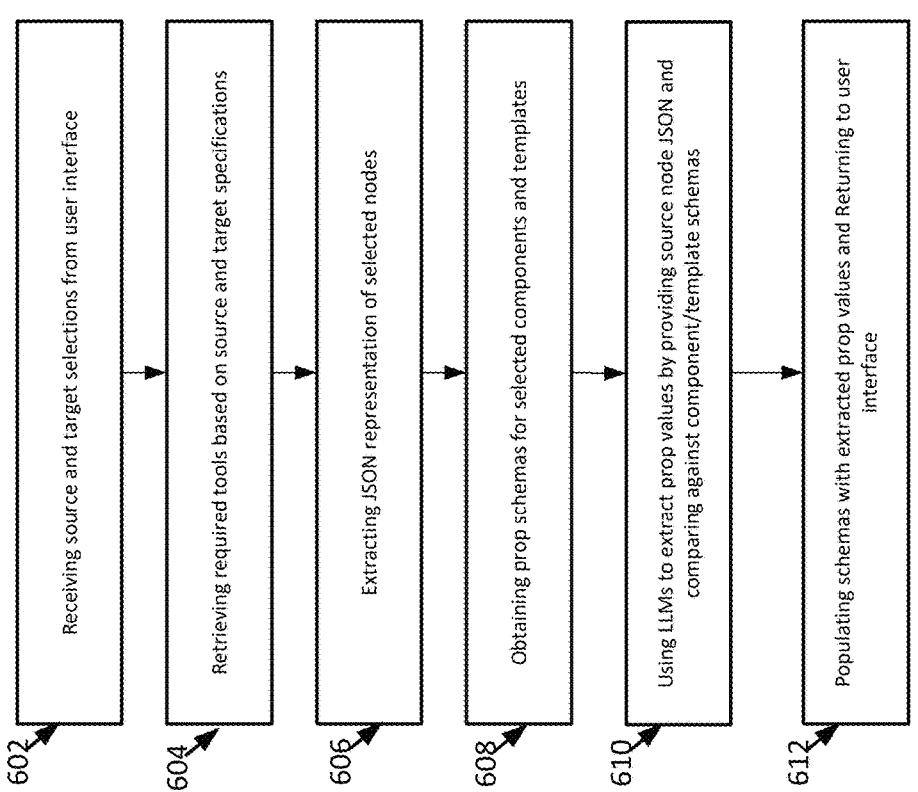

600

602  Receiving source and target selections from user interface

604  Retrieving required tools based on source and target specifications

606  Extracting JSON representation of selected nodes

608  Obtaining prop schemas for selected components and templates

610  Using LLMs to extract prop values by providing source node JSON and comparing against component/template schemas 612  Populating schemas with extracted prop values and Returning to user interface

FIG. 6

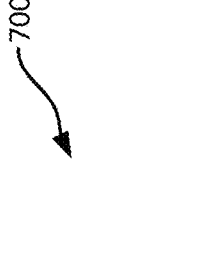
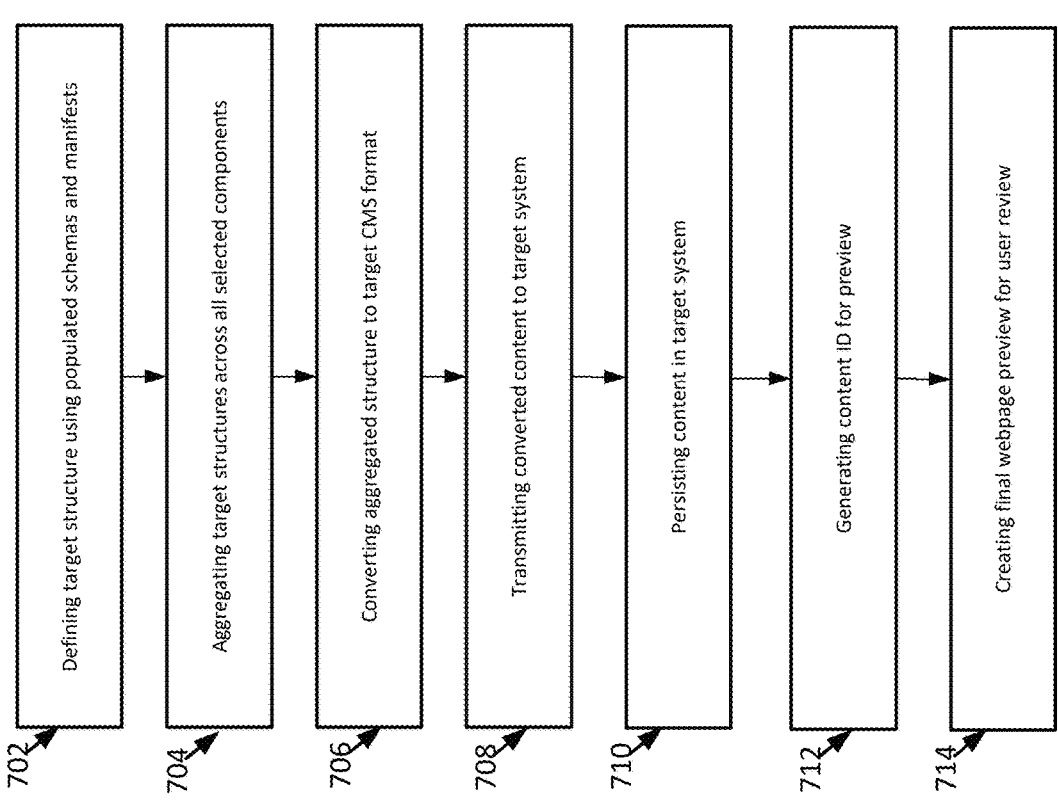
FIG. 7

ENABLING AUTOMATION OF WEB CONTENT AUTHORING WORKFLOW THROUGH GENAI

BACKGROUND

Web content authoring has become an important part of digital marketing and online presence for businesses and organizations. Content management systems (CMS) have evolved to facilitate the creation, management, and publication of web content. These systems typically provide interfaces for content authors to input text, images, and other media elements, which are then rendered into web pages. Many CMS platforms also offer templates and reusable components to streamline the content creation process and maintain consistency across websites.

However, the current state of web content authoring still faces several challenges. The process often requires manual intervention at multiple stages, from interpreting design mockups to implementing them in the CMS. This manual approach can be time-consuming and prone to errors, especially when dealing with complex layouts or frequently changing content. Additionally, there is often a disconnect between the design tools used by UX designers and the CMS used by content authors, leading to inefficiencies in translating designs into functional web pages. The reliance on tribal knowledge within authoring teams regarding existing content and components can also limit the scalability and consistency of content creation efforts across large organizations.

SUMMARY

Embodiments disclosed herein solve the aforementioned technical problems and may provide other technical solutions as well. Contrary to conventional techniques, the disclosed solution includes a novel method and system for automating web content authoring workflow through generative artificial intelligence (GenAI) and multimodal retrieval-augmented generation (RAG) systems that convert user experience (UX) designs into functional web content by segmenting designs into logical nodes, identifying matching components, extracting and mapping data to component schemas, and converting populated schemas to target content management system formats.

In some aspects the disclosure includes a computer-implemented method for automating web content authoring workflow, comprising receiving a user experience (UX) design file from a design tool, segmenting the UX design file into a plurality of logical nodes using a large language model (LLM), wherein each logical node represents a distinct component of the UX design, converting each logical node into an image representation, performing image similarity searches using multimodal retrieval-augmented generation (RAG) systems to identify matching reusable content blocks, design components, and templates from a database, extracting data from the logical nodes and mapping the extracted data to component schemas using the LLM, wherein the component schemas define customizable attributes for the identified matching components, and generating web content, the generating comprising converting the component schemas into a target content management system format.

In some aspects the disclosure includes a system for automating web content authoring workflow, comprising a processor, a large language model (LLM), a user interface, and a memory storing instructions that, when executed by the processor, cause the system to: receive a user experience (UX) design file from a design tool, segment the UX design file into a plurality of logical nodes using the LLM, wherein each logical node represents a distinct component of the UX design, convert each logical node into an image representation, perform image similarity searches using multimodal retrieval-augmented generation (RAG) systems to identify matching reusable content blocks, design components, and templates from a database, extract data from the logical nodes and map the extracted data to component schemas using the LLM, wherein the component schemas define customizable attributes for the identified matching components, and generate web content by performing processing comprising converting the component schemas into a target content management system format.

BRIEF DESCRIPTION OF THE DRAWINGS

So that the present disclosure can be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may apply to other equally effective example embodiments.

FIG. 2 depicts a block diagram of a content authoring system, according to aspects of the present disclosure.

FIG. 4 presents a flowchart of a method for processing and segmenting design content, according to aspects of the present disclosure.

FIG. 5 illustrates a flowchart of a method for processing and identifying content from segmented nodes, according to aspects of the present disclosure.

FIG. 6 depicts a flowchart of a method for prop extraction and mapping in a content authoring system, according to aspects of the present disclosure.

FIG. 7 shows a flowchart of a method for converting design content to a target system format, according to aspects of the present disclosure.

DETAILED DESCRIPTION OF SEVERAL EMBODIMENTS

Figure 1:
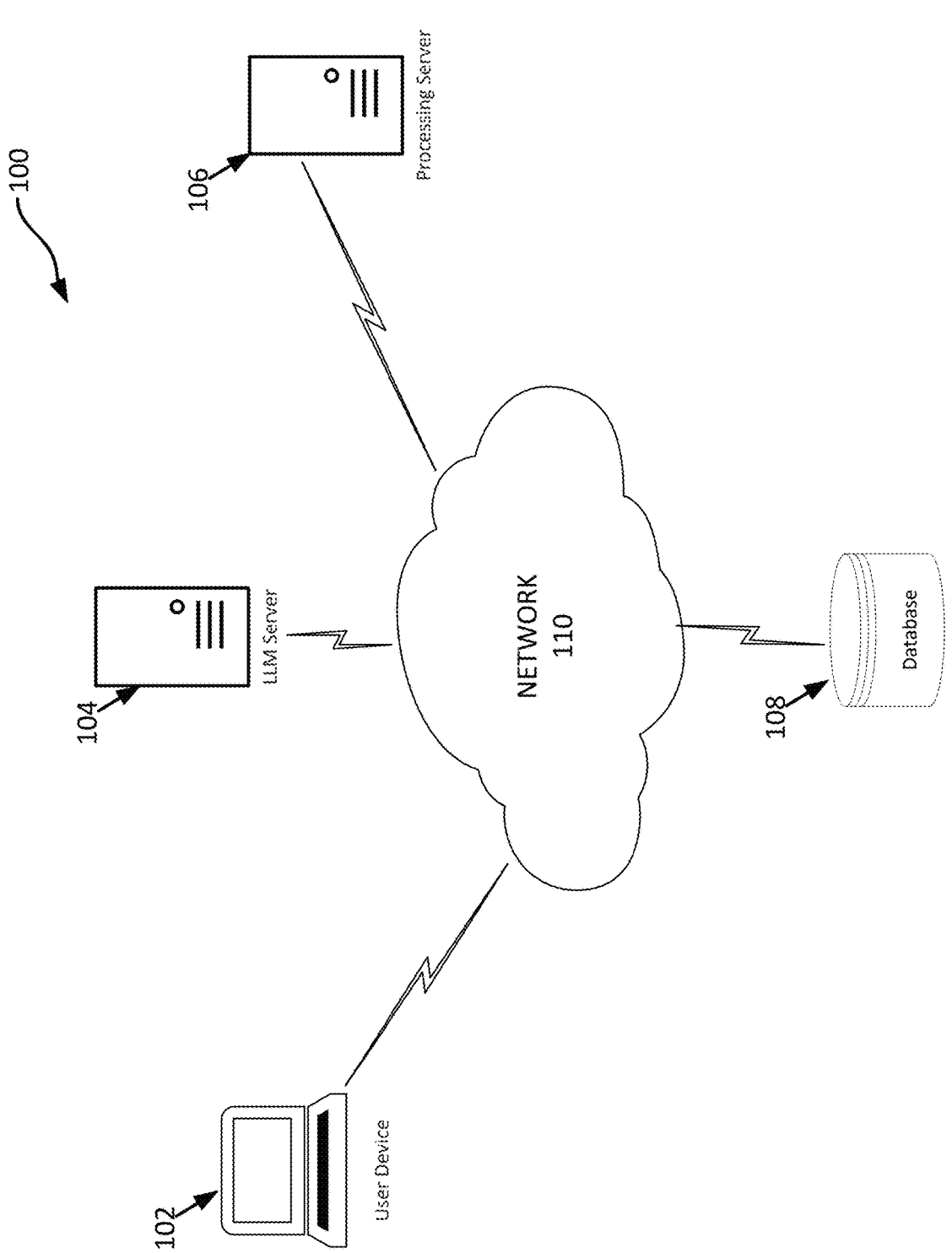
FIG. 1 illustrates a network system for enabling communication between computing components, according to aspects of the present disclosure.

The present disclosure relates to systems and methods for automated web content authoring which provides a novel approach to converting UX designs into functional web content using generative artificial intelligence (GenAI) and multimodal RAG systems. This innovative system streamlines the content authoring process by eliminating manual steps and reducing dependency on tribal knowledge within authoring teams.

The system may receive a UX design file from a web-page design tool and process it through a series of automated steps. The web-page design tool may allow designers to create visual layouts and user interface elements through a graphical interface, storing the design data in a structured format such as JavaScript Object Notation (JSON) that captures the hierarchical relationships, positioning, styling, and properties of design components within the project. In some cases, the system may segment the design into logical nodes, identify matching components and templates, extract and map data to component schemas, and convert the populated schemas into a target CMS format. This automated workflow may significantly reduce the time and effort to create web content from UX designs.

One of the benefits of this system may be its ability to leverage artificial intelligence to understand and process complex design structures. The system may use large language models (LLMs) to analyze design files and identify logical segments based on various parameters such as naming conventions, dimensions, and relative positioning. This approach may allow for more accurate and consistent segmentation of designs compared to manual processes.

Another advantage of the system may be its use of multimodal RAG systems for identifying matching components and templates. By converting design segments into standardized image representations and using image similarity searches, the system may be able to find relevant existing content blocks, design components, and templates across different systems and libraries. This capability may enhance content reusability and maintain design consistency across web properties.

The system's data extraction and mapping process may also offer significant improvements over manual methods. By using LLMs to analyze component schemas and design data, the system may be able to intelligently populate attribute values, even for nested and complex component structures. This automated approach may reduce errors and inconsistencies that can occur during manual data entry and mapping.

In some cases, the system may be implemented as a plug-and-play framework that can accommodate various source and target systems. This flexibility may allow organizations to integrate the automated content authoring workflow with their existing design tools and CMSs, potentially reducing implementation costs and improving adoption rates.

To illustrate the system's capabilities, consider a real-world example where a UX designer creates a new product landing page design in a web-page design platform. The design may include a header with navigation, a hero section with a product image and call-to-action button, an accordion-style feature list, and a footer. Once the design is finalized, the UX designer may submit it to the automated web content authoring system.

The system may first use GenAI to analyze the web-page design file and segment it into logical nodes, identifying the header, hero, accordion, and footer as distinct components. It may then convert each of these segments into standardized image representations for further processing.

Next, the system may employ multimodal RAGs to perform image similarity searches across its database of existing content blocks, design components, and templates. For instance, it may match the header with an existing navigation component, the hero section with a custom content block from the CMS, and the accordion with a reusable component from a design system.

The system may then use LLMs to extract relevant data from the web-page design and map it to the identified components' schemas. For example, it may populate the hero component's schema with the product name, description, image URL, and button text from the design.

Finally, the system may convert the populated schemas into the target CMS format and persist the data, effectively creating a fully functional webpage that closely matches the original design, without manual intervention from the web authoring team.

This automated approach may offer several benefits, including increased efficiency in content creation, improved consistency across web properties, reduced reliance on specialized knowledge of CMSs and design libraries, and faster time-to-market for new web content. By streamlining the web content authoring workflow, organizations may be able to focus more resources on creating designs and content, rather than on the technical implementation details of translating those designs into functional web pages.

The network system 100 may include a user device 102, an LLM server 104, a processing server 106, a database 108, and a network 110. The network system 100 may enable communication and data exchange between multiple computing components to facilitate automated web content authoring workflow.

In some cases, the user device 102 may be connected to the network 110, allowing the user device 102 to communicate with other components in the network system 100. The user device 102 may be a computer, smartphone, tablet, or any other device capable of accessing and interacting with the network system 100. The user device 102 may include a processor, a user interface, and a memory storing instructions for executing various operations related to web content authoring.

The LLM server 104 may be connected to the network 110 and may be configured to process requests from the user device 102. The LLM server 104 may host one or more LLMs that can perform tasks such as design segmentation, data extraction, and mapping operations. In some cases, the LLM server 104 may receive input from the user device 102, process the input using the hosted LLMs, and return the results back to the user device 102 or the processing server 106.

The processing server 106 may also be connected to the network 110, enabling the processing server 106 to perform computational tasks and data processing operations. The processing server 106 may be responsible for executing various steps in the automated web content authoring workflow, such as converting logical nodes into image representations, performing image similarity searches, and converting component schemas into target CMS formats.

The database 108 may be connected to the network 110 and may be configured to store and retrieve data as needed by other components in the network system 100. In some cases, the database 108 may store reusable content blocks, design components, templates, and other resources used in the web content authoring process. The database 108 may also store embeddings created from images of existing content for use in multimodal RAG systems.

The network 110 may provide the communication infrastructure that enables data exchange between the user device 102, LLM server 104, processing server 106, and database 108. The network 110 may be implemented as a local area network (LAN), wide area network (WAN), or the Internet, using various communication protocols to facilitate secure and efficient data transfer between the components of the network system 100.

In an example use case, a web designer using the user device 102 may initiate the automated web content authoring process by submitting a UX design file through a user interface. The UX design file may be transmitted over the network 110 to the processing server 106. The processing server 106 may then communicate with the LLM server 104 to segment the design into logical nodes. The processing server 106 may convert these nodes into image representations and perform similarity searches using data stored in the database 108. Throughout this process, the components of the network system 100 may continuously exchange data and instructions, leveraging the network infrastructure to enable a seamless and efficient automated web content authoring workflow. Details of this workflow are described below.

FIG. 2 illustrates a block diagram of a content authoring system 200 that includes a user interface 202, a content authoring AI plugin 204, and a tool module 206. The tool module 206 may include multiple components including an internal orchestrator 206A, a tool configuration 206B, a reusable block tool 206C, a component tool 206D, an aggregator 206E, a template tool 206F, a retrieval augmented generation 206G, a schema storage 206H, a generation orchestrator 206I, and a target system 206J.

The content authoring system 200 may be configured to process UX designs and generate web content. The user interface 202 may provide a means for users to interact with the system, input UX designs, and view generated content. The content authoring AI plugin 204 may serve as an intermediary between the user interface 202 and the tool module 206, facilitating the flow of data and commands.

Within the tool module 206, the internal orchestrator 206A may handle request parsing and validation, determining the choice and order of execution across various tools based on the specific use case. The tool configuration 206B may store configurations for tools, including descriptions, associated classes, and methods. The reusable block tool 206C, component tool 206D, and template tool 206F may be customized for supporting recommendation, data extraction/ mapping, and conversion to the target system for their respective content types.

The aggregator 206E may handle the aggregation of results across the execution of various tools for workflows including recommendation, prop extraction/mapping, and final conversion to the target CMS. The retrieval augmented generation 206G may contain multimodal RAGs with image embeddings of reusable content blocks, templates, and UX components, enabling cosine similarity score-based recommendation flow through similarity search based on image embeddings.

The schema storage 206H, which may be supported using AWS S3 for example, may contain detailed schemas for each UX component and template. These schemas may include a list of supported props for the component/template, associated descriptions, and instructions to enable LLMs to identify, extract, and map prop values when provided with a UX design. The generation orchestrator 206I may provide a centralized capability that supports invocation of multiple LLMs with built-in compliance. The target system 206J may refer to the target CMS system where the page or design needs to be authored.

In an example use case, a user may upload a UX design through the user interface 202. The content authoring AI plugin 204 may process this input and pass it to the tool module 206. The internal orchestrator 206A may then determine the workflow, first invoking the generation orchestrator 206I to segment the design using an LLM.

The internal orchestrator 206A may use the tool configuration 206B to retrieve the tools for processing the segmented design. The reusable block tool 206C, component tool 206D, and template tool 206F may then process their respective parts of the design, utilizing the retrieval augmented generation 206G for similarity searches and recommendations.

The aggregator 206E may combine the results from these tools, and the generation orchestrator 206I may be used again for prop extraction and mapping. The processed content may then be converted to the format of the target system 206J and sent back to the user interface 202 for preview and further editing if beneficial.

Figure 3:
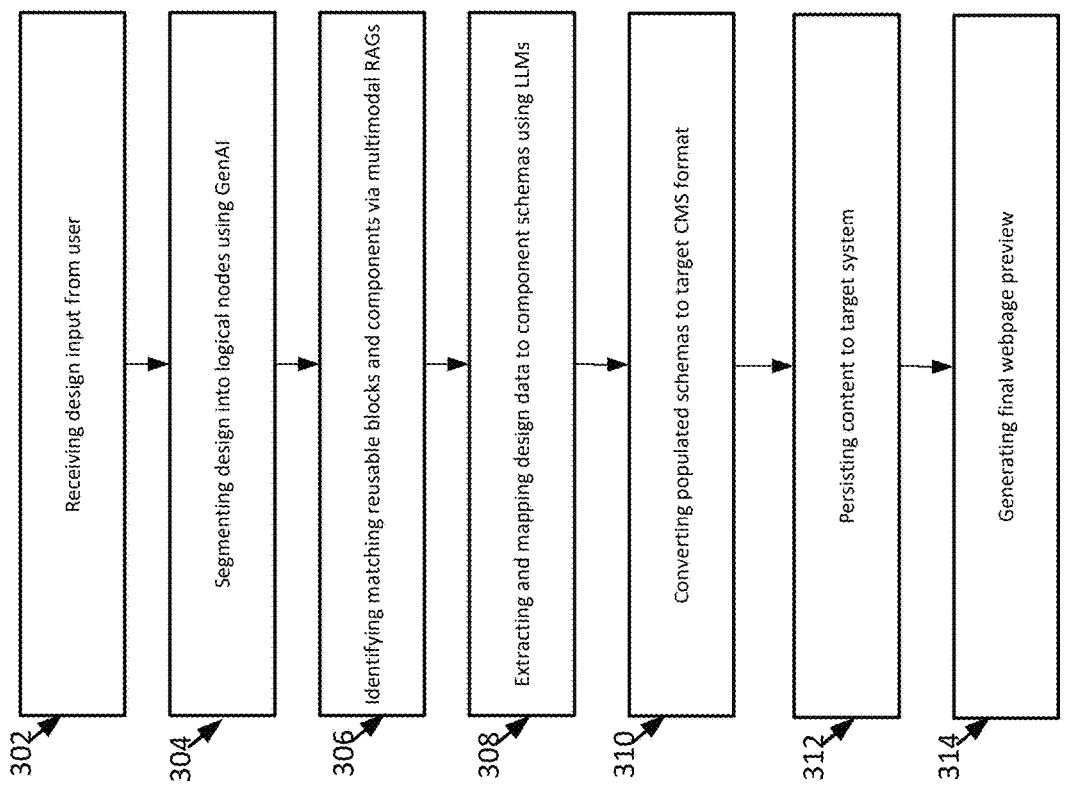
FIG. 3 shows a flowchart of a method for automated web content authoring, according to aspects of the present disclosure.

FIG. 3 illustrates an overall flowchart of a method 300 for automated web content authoring. The method 300 may include receiving design input 302, segmenting the design into logical nodes 304, identifying matching reusable blocks and components 306, extracting and mapping design data 308, converting populated schemas to a target format 310, persisting content to a target system 312, and generating a final webpage preview 314.

In 302, the system may receive design input from a user. This design input may be in the form of a UX design file from a design tool. The UX design file may contain a JSON representation of design nodes, which includes information about the layout, styling, and content of the webpage.

The system may process the received design file to prepare it for further analysis. This processing may involve extracting relevant data from the JSON representation and organizing it into a format that can be easily parsed by subsequent steps in the method 300.

In 304, the system may segment the design into logical nodes using an LLM. Each logical node may represent a distinct component of the UX design, such as a header, navigation menu, content section, or footer.

The LLM may analyze the processed design file and identify logical segments based on various parameters. These parameters may include naming conventions, dimensions, relative positioning, and sibling node relationships. For example, the LLM may recognize that a group of elements with similar styling and positioned at the top of the page likely represents a header component. The system uses a specialized prompt that instructs the LLM to act as an expert in UI design analysis, providing specific guidelines for identifying sections, analyzing bounding boxes and positioning, considering dimensions and hierarchy, and using naming hints as cues. For example, the LLM may recognize that a group of elements with similar styling and positioned at the top of the page likely represents a header component. The prompt instructs the LLM not to rely on predefined component classifications but instead to analyze node metadata including names, positions, and relationships to determine optimal grouping, and to return results in a structured JSON format that includes node IDs, names, and reasons for selection.

In 306, the system may identify matching reusable blocks and components via multimodal RAG systems. This step may involve converting each logical node into an image representation.

The system may preprocess the images using computer vision libraries such as OpenCV to perform resizing and masking operations. These operations may remove image portions to increase resemblance to base component template images. The preprocessed images may then be used to execute image similarity searches through multimodal RAG systems. For example, for nodes containing image layers, such as a hero section with text and buttons on the left and an image on the right, the system may determine the absolute position of the image layer using the JSON representation. The system may then mask this image layer by superimposing a plain white background on the extracted dimensions, ensuring that elements of the image do not interfere with subsequent image similarity comparisons. After masking, each modified node image may be resized to specific dimensions to maintain parity with the image sizes stored in the RAG systems. For performing similarity searches, the system may maintain separate multimodal RAGs for each content type, including reusable content blocks, UX components, and CMS templates, with image embeddings stored in vector stores. Each preprocessed UX design node image may be converted to an image embedding and compared with the embeddings present in the appropriate RAG using cosine similarity to determine the top matches for each content type.

In 308, the system may extract and map design data to component schemas using the LLM. The component schemas may define customizable attributes for the identified matching components.

The LLM may analyze the logical nodes and their corresponding image representations to extract relevant data. This data may include text content, styling information, and structural relationships between elements. The LLM may then map this extracted data to the appropriate fields in the component schemas. The system may employ a specialized template mapping approach where the LLM acts as an expert in analyzing UX design structures and determining appropriate values for component properties. For each logical node, the LLM receives both the JSON structure of the design and the component schema that defines customizable attributes. The LLM analyzes text styles by processing style-specific XML tags in the design, considers hidden nodes, and handles repeatable components by identifying multiple occurrences within parent structures. For each component property, the LLM provides not only the extracted value but also detailed reasoning explaining how the value was determined from the design elements. This structured approach ensures accurate mapping between visual designs and functional components, even for complex nested structures with multiple occurrences of similar elements.

In 310, the system may convert the populated schemas to a target CMS format. This conversion process may involve transforming the structured data from the component schemas into a format that can be understood and processed by the target CMS.

The system may use predefined conversion rules or templates to ensure that the converted content maintains the intended layout, styling, and functionality of the original design. This step may also involve resolving any compatibility issues between the source design format and the target CMS format.

In 312, the system may persist the content to the target system. This may involve saving the converted content to the database or file system of the target CMS.

The system may also perform any integration tasks to ensure that the newly created content is properly linked and accessible within the target CMS. This may include updating navigation menus, sitemaps, or other content organization structures. While persisting the extracted node and its mapping to target CMS, the system may make use of a transformer to convert the populated schema to a JSON structure compatible with the CMS and then invokes APIs for persistence. When integrated, each such newly generated content is assigned a unique name and identifier which is then returned to the end user, enabling efficient tracking and management of the generated content within the target system.

In 314, the system may generate a final webpage preview. This preview may allow users to visualize how the converted content will appear when rendered in a web browser.

The system may use the persisted content from the target CMS to generate an interactive preview of the webpage. This preview may include the visual elements, styling, and functionality specified in the original UX design. Users may be able to interact with the preview to verify that components are working as intended before publishing the content.

In an example use case, consider a UX designer who has created a product landing page design in a web-page design tool that includes a navigation header, hero section with product imagery, feature comparison table, customer testimonials, and a contact form footer. In 302, the designer may submit the web-page design URL through the system's user interface, and the system may retrieve the design file containing the JSON representation of design nodes, including their hierarchical relationships, positioning data, and styling properties. The system may then process this JSON data to extract relevant information about each design element, organizing it into a structured format for subsequent analysis.

Moving through the remaining steps, in 304, the LLM may analyze the processed design data and segment it into logical nodes such as "header-navigation," "hero-product-showcase," "feature-comparison-table," "testimonial-section," and "contact-footer" based on naming conventions and spatial relationships. In 306, the system may convert each logical node into standardized images and perform similarity searches through multimodal RAG systems to identify matching components from existing libraries, such as finding a similar navigation component or testimonial card template. In 308, the LLM may extract specific data like product names, feature descriptions, and testimonial text from the design nodes and mapping these values to the schemas of the identified components. In 310, the system may convert the populated schemas into the target CMS format, transforming the design data into content blocks compatible with the organization's CMS. In 312, this converted content may persist to the target CMS database, creating draft pages and linking components appropriately. Finally, in 314, the system may generate a fully functional webpage preview that displays the product landing page as it may appear to end users, allowing the designer to review and approve the automated conversion before publication.

FIG. 4 illustrates a flowchart of a method 400 for processing and segmenting design content. The method 400 includes receiving web-page design URL input 402, preprocessing to extract JSON representation 404, pruning irrelevant data 406, querying an LLM with instructions 408, analyzing nodes based on various parameters 410, identifying logical segments and assigning IDs 412, and returning segmented node IDs to the user interface 414.

In 402, the system may receive web-page design URL input from a user. The web-page design URL may contain a link to a UX design file created using the web-page design tool. This URL may serve as the entry point for the automated web content authoring workflow.

The system may parse the URL to extract relevant information such as the project ID, file ID, and any specific node references within the web-page design. This parsed information may be used to authenticate and access the web-page design tool API, allowing the system to retrieve the full design file data.

In 404, the system may preprocess the web-page design tool source to extract internal node representation in JSON format. The system may utilize the web-page design tool API to retrieve the complete design file data, which may include information about design elements, their properties, and hierarchical relationships.

The system may traverse the retrieved data structure and convert it into a standardized JSON format. This JSON representation may capture the hierarchy of design nodes, including frames, groups, shapes, text elements, and their respective properties such as position, size, color, and styling information. For example, the JSON may include a "document" object containing a "children" array with nested node objects, where each node has properties like "id", "name", "type" (e.g., "CONTAINER", "ELEMENT-_GROUP", "TEXT_BLOCK"), "absoluteBoundingBox" with x, y, width, and height coordinates, "fills" array with color information, "characters" for text content, and "style" object containing font properties. The JSON may also include metadata about parent-child relationships through properties like "children" arrays and "parent" references, enabling the system to understand the complete hierarchical structure of the design.

In 406, the system may prune irrelevant data from the extracted JSON. The pruning process may involve removing unnecessary metadata, version history, or other extraneous information that may not be directly relevant to the content generation process.

The system may apply filtering rules to retain certain design information. For example, the system may remove hidden layers, unused styles, or components that are not part of the visible design. This pruning step may help reduce the complexity of the data and improve processing efficiency in subsequent steps.

In 408, the system may query an LLM with the web-page design tool JSON and segmentation instructions. The system may construct a prompt for the LLM that includes the pruned JSON representation of the design along with specific instructions for identifying logical segments within the design.

The prompt may include guidelines for the LLM to consider factors such as naming conventions, spatial relationships, and design hierarchy when identifying segments. For example, the system may instruct the LLM to look for patterns in node names that suggest logical groupings, such as "header," "main-content," or "footer."

In 410, the system may analyze nodes based on naming conventions, dimensions, and positioning parameters. The LLM may process the JSON representation and apply natural language understanding to interpret node names and their semantic meanings. The LLM processing in 410 may be similar to that described earlier for design segmentation. The system may use a specialized prompt that instructs the LLM to act as an expert in UI design analysis, providing specific guidelines for identifying sections, analyzing bounding boxes and positioning, considering dimensions and hierarchy, and using naming hints as cues. This approach may allow the LLM to leverage its understanding of design principles and natural language processing capabilities to effectively analyze and group the nodes based on their characteristics and relationships.

The system may use the LLM's analysis to identify patterns in node naming that suggest logical groupings. For example, nodes named "nav-item-1," "nav-item-2," etc., may be recognized as part of a navigation component. The system may also consider the spatial relationships between nodes, grouping elements that are in close proximity or aligned with each other. Additionally, the system may analyze the dimensions of nodes to identify potential container elements or content blocks. This analysis may be performed using a specialized prompt with the preprocessed JSON as input, which instructs the LLM to examine node metadata including names, positions, dimensions, and hierarchical relationships to determine optimal logical groupings while avoiding reliance on predefined component classifications.

In 412, the system may identify logical segments within the design. Based on the analysis performed at 410, the system may group related nodes into coherent logical segments that represent distinct components or sections of the UX design.

The system retains the original node IDs from the source system rather than generating new identifiers. These node IDs maintain the original structure and relationships defined in the web-page design tool. For example, a header segment might retain its original ID such as "32:19703" with its original node name "Header (Web+Mobile)" preserved from the source system.

In 414, the system may return the segmented node IDs to the user interface. The system may compile a list of the identified logical segments that includes the original node IDs, node preview URLs, and node names as obtained from the source system.

The system maintains the original UXdesign tool JSON structure when returning the segmented node data. This approach preserves the hierarchical relationships, positioning information, and styling properties defined in the source system. The returned data may include the original node IDs, node names, and relevant metadata from the UX design tool, ensuring that subsequent processing steps can reference and utilize the authentic design specifications without translation errors or information loss.

In an example use case, consider a UX designer who has created a comprehensive e-commerce product page design in a web-page design tool that includes a sticky navigation bar, breadcrumb trail, product image gallery, product details section, customer reviews, related products carousel, and a promotional banner footer. In 402, the designer may input the web-page design tool URL "https://www.design-canvas-.com/file/abc123/ecommerce-product-page" through the system interface, and the system may parse this URL to extract the project identifier "abc123" and file reference "ecommerce-product-page." The system may then authenticate with the web-page design tool API using stored credentials and retrieve the complete design file data. In 404, the system may traverse the hierarchical structure of the design file and extract a comprehensive JSON representation that captures 47 design nodes, including their nested relationships, positioning coordinates, styling properties like colors and fonts, and content such as product titles and review text.

Moving through the remaining steps of method 400, in 406, the system may prune extraneous data from the extracted JSON by removing 12 hidden guide layers, version history metadata, and unused color swatches, reducing the dataset from 2.3 MB to 890 KB for more efficient processing. In 408, the system may construct a detailed prompt for the LLM that includes the pruned JSON along with specific segmentation instructions, such as "identify logical components based on semantic naming patterns like 'nav-', 'product-', 'review-' and spatial clustering of elements within 50-pixel proximity." In 410, the LLM may analyze the node data and identify patterns such as grouping nodes named "nav-logo," "nav-search," and "nav-cart" based on their shared "nav-" prefix and top-aligned positioning at y-coordinate 0, while recognizing that nodes with dimensions exceeding 800 px width likely represent content sections. In 412, the system may create logical segments like "segment-navigation-001" containing the header elements, "segment-product-gallery-002" for the image carousel, and "segment-reviews-003" for the customer feedback section, assigning hierarchical IDs that reflect parent-child relationships. Finally, in 414, the system may return a structured JSON response to the user interface containing the 8 identified segments with their unique IDs, bounding box coordinates, and metadata such as estimated content complexity scores, enabling the user to review and approve the automated segmentation before proceeding to the next phase of content generation.

FIG. 5 illustrates a flowchart of a method 500 for processing and identifying content from segmented nodes. The method 500 includes processing segmented nodes to generate image representations 502, retrieving tools from Tool Configuration 504, querying Multi-Modal RAG with node images for similarity matching 506, preprocessing node images using OpenCV for resizing and masking 508, querying Component/Block multimodal RAG with processed images 510, receiving top matches from RAG systems 512, and presenting consolidated recommendations to user interface 514.

In 502, the system may process segmented nodes to generate image representations. The system may convert each logical node identified during the design segmentation process into an image format suitable for further analysis. This conversion may involve extracting visual information from the node's design elements and creating a standardized image representation. For example, a header node may be converted into an image that captures its layout, text placement, and graphical elements.

The system may utilize various image processing techniques to ensure the generated images accurately represent the design elements of each node. These techniques may include vector-to-raster conversion for scalable graphics, color space normalization to ensure consistent representation across different design tools, and resolution adjustment to optimize for subsequent processing steps.

In 504, the system may retrieve tools from Tool Configuration. The system may access a configuration database to determine which specific tools and libraries are beneficial for processing the generated images. This step may involve loading preprocessing algorithms, similarity matching functions, and any custom tools developed for specific design elements or components.

The Tool Configuration may contain metadata about each tool, including its purpose, input requirements, and output format. For instance, the configuration may specify that OpenCV libraries are to be used for image preprocessing, while a custom-developed similarity matching algorithm may be beneficial for comparing specific types of design.

In step 506, the system may query Multi-Modal RAG with node images for similarity matching. The system may utilize a multimodal Retrieval Augmented Generation (RAG) system to compare the processed node images against a database of existing reusable content blocks, design components, and templates. The similarity matching may be performed using a similarity search of embeddings where embeddings are numerical vectors that represent the images. The similarity metric is essentially a distance calculation between the vectors in the data store and a vector representation of the input image, allowing for efficient and accurate identification of visually similar components.

The similarity matching process may involve calculating cosine similarity scores between the vector representations of the input node images and the embeddings stored in the RAG system. For example, a hero section image from the input design may be compared against embeddings of various hero section templates in the database to find the closest matches.

In 508, the system may preprocess node images using OpenCV for resizing and masking. The system may utilize OpenCV libraries to perform image preprocessing operations that enhance the accuracy of subsequent similarity matching. These operations may include resizing the images to a standardized dimension and applying masking techniques to focus on certain visual elements.

The masking operations may remove image portions to increase resemblance to base component template images. For instance, when processing a button component, the system may mask out background elements and focus on the button's shape, size, and text placement. This masking may help in identifying similar button components from the existing library, even if they have different color schemes or surrounding elements.

In step 510, the system may query Component/Block multimodal RAG with processed images. After preprocessing, the system may perform similarity matching specifically for components and CMS templates using the enhanced images. Unlike the similarity search for reusable content blocks in step 506 which does not require preprocessing, this step may focus on identifying specific design components or templates that match the preprocessed node images, leveraging the masking and resizing operations performed in step 508 to improve matching accuracy for these more structured elements.

The Component/Block multimodal RAG may contain embeddings specifically created for design components and templates. For example, the system may compare a preprocessed image of a navigation menu against embeddings of various navigation component templates to find the best match in terms of layout and structure.

In 512, the system may receive top matches from RAG systems. The system may collect and aggregate the results from the various similarity matching queries performed in the previous steps. These top matches may represent the most similar existing content blocks, design components, and templates found in the database for each processed node image.

The system may apply ranking algorithms to sort the matches based on similarity scores, relevance to the current design context, and other predefined criteria. For instance, if multiple button components are identified as potential matches, the system may rank them based on how closely they match the input button's size, shape, and placement within the overall design.

In 514, the system may present consolidated recommendations to the user interface. The system may organize and format the top matches and recommendations for each processed node in a way that is easily understandable and actionable for the user. This presentation may include visual previews of the recommended components, similarity scores, and options for customization.

The user interface may display these recommendations in a hierarchical structure that mirrors the original design layout. For example, recommendations for a header component may be presented first, followed by suggestions for main content sections and footer elements. This structured presentation may allow users to quickly assess and select appropriate components for each part of their design.

In an example use case, consider the e-commerce product page design from the previous example that has been segmented into 8 logical components including the navigation bar, product gallery, and customer reviews section. In 502, the system may convert each of these 8 segmented nodes into standardized PNG images at 1024×768 resolution, with the navigation segment generating an image showing the logo placement, search bar, and cart icon layout, while the product gallery segment may produce an image displaying the thumbnail grid arrangement and main product image positioning. The system may apply vector-to-raster conversion to preserve the visual fidelity of design elements and normalize color spaces to RGB format for consistent processing. In 504, the system may retrieve specific tools from the Tool Configuration database, including OpenCV libraries for image manipulation, a custom similarity matching algorithm optimized for e-commerce components, and preprocessing filters designed for product page layouts. The system may also load specialized tools for handling carousel components and review card templates based on the identified segment types.

Moving through the remaining steps, in 506, the system may query the Multi-Modal RAG system with the 8 generated images, comparing them against a database containing embeddings of over 10,000 existing e-commerce component images, and may identify initial matches such as a navigation template with 0.87 cosine similarity score and a product gallery template with 0.82 similarity score. In 508, the system may preprocess the node images using OpenCV operations, resizing the navigation image to 800×100 pixels and applying masking to remove background colors, while cropping the product gallery image to focus on the grid layout structure and removing promotional overlays that might interfere with template matching. In 510, the system may perform refined similarity searches using the preprocessed images against specialized Component/Block RAG systems, identifying more precise matches such as a "sticky-navigation-with-search" component and a "product-image-carousel-with-thumbnails" template. In steps 512 and 514, the system may aggregate the top 3 matches for each segment with similarity scores ranging from 0.75 to 0.91, and present these consolidated recommendations through the user interface in a visual grid format, displaying thumbnail previews of each recommended component alongside the original segmented node, along with metadata such as component names, compatibility scores, and customization options, enabling the designer to review and select the appropriate matches for each section of their e-commerce product page.

FIG. 6 illustrates a flowchart of a method 600 for prop extraction and mapping in a content authoring system. The method 600 includes receiving source and target selections 602, retrieving tools 604, extracting JSON representation 606, obtaining prop schemas 608, using LLMs to extract prop values 610, and populating schemas with extracted values 612.

In 602, the system may receive source and target selections from a user interface. The source selections may include the segmented nodes of the UX design, while the target selections may include the identified matching components and templates. The system may store these selections in memory for further processing.

The system may present the user with a visual representation of the segmented nodes and potential matching components on the user interface. The user may then interact with this interface to make selections, which the system captures and processes for the subsequent steps.

In 604, the system may retrieve tools based on source and target specifications. These tools may include specialized modules for handling different types of components or templates. The system may consult a tool configuration database to determine which tools are beneficial for processing the selected source and target elements.

For example, if the source includes a complex nested structure, the system may retrieve a recursive processing tool. If the target is a specific type of component, such as an accordion or carousel, the system may retrieve a specialized tool designed to handle the unique properties of that component type.

In 606, the system may extract JSON representation of selected nodes. The system may parse the original UX design file to isolate the JSON data corresponding to the user-selected nodes. This extraction process may involve traversing the design file's structure and copying relevant portions into a new JSON object.

The extracted JSON may contain detailed information about the node's properties, including its dimensions, styling, content, and relationships to other nodes. For instance, a JSON representation of a design element may include properties such as identifiers, type classification, descriptive names, text content, styling attributes like font specifications, visual properties such as fill types and colors, positioning coordinates with dimensions, and references to parent containers. This structured format enables the system to accurately process and interpret the design elements.

In 608, the system may obtain prop schemas for selected components and templates. These schemas may define the structure and constraints of the properties (props) that can be customized for each component or template. The system may retrieve these schemas from a schema storage, which may be implemented using a database or file system.

A prop schema may include details such as the prop name, data type, description, default value, and possible values. For example, a schema for a card component may define props like "title" (string), "image" (URL), "description" (string), and "actionButton" (object with its own set of props).

In step 610, the system may use LLMs to extract prop values by providing source node JSON and comparing against component/block pattern schemas. The system may employ a specialized prompt that instructs the LLM to act as an expert in UX design analysis and component mapping. The prompt may include the extracted JSON from step 606, the prop schemas from step 608, and detailed instructions for analyzing the design structure. For example, when processing a hero section, the prompt may direct the LLM to identify specific elements like headings, descriptions, and background images by analyzing text styles, dimensions, and positioning. The prompt may also include instructions for handling nested components, repeatable elements, and special content types. The LLM analyzes the JSON structure against the schema definitions, providing not only the extracted values for each prop but also detailed reasoning explaining how each value was determined from the design elements. This structured approach ensures accurate mapping between visual designs and functional components, even for complex nested structures with multiple occurrences of similar elements.

The LLM may employ natural language processing and reasoning capabilities to interpret the design intent from the JSON representation and map it to the appropriate props. For instance, when processing a hero section, the LLM may identify the largest text element as the title, the next largest as a subtitle, and an image as the background, mapping these to the corresponding props in the hero component schema.

In 612, the system may populate the schemas with extracted prop values and return them to the user interface. The system may take the prop values extracted by the LLM and use them to fill in the prop schemas for each component or template. The populated schemas may then be sent back to the user interface for review or further processing.

The system may present the populated schemas in a user-friendly format, allowing the user to verify and potentially adjust the extracted values. This step may also involve validation to ensure that props have been populated and that the values meet any constraints defined in the schemas.

In some cases, the system may recursively process nested child components within the logical nodes to populate values for child component attributes. For complex components that contain other components, the system may apply the extraction and mapping process recursively. The system may identify child components within a parent node, retrieve their respective schemas, and extract values for their props.

For example, when processing a layout component that contains multiple card components, the system may first extract props for the layout (e.g., number of columns, spacing), then recursively process each card within the layout, extracting and mapping props for each individual card.

The component schemas may comprise details of the customizable attributes including name, type, description, and possible values for internal attributes and dynamic child components. These detailed schemas may enable the system to accurately map design elements to component properties, even for complex or highly customizable components.

For instance, a schema for an accordion component may include attributes such as: —"title" (name: "title", type: "string", description: "The main heading for the accordion"), —"sections" (name: "sections", type: "array", description: "An array of section objects", items: {type: "object", properties: {heading: {type: "string"}, content: {type: "string"}}}), and —"expandedByDefault" (name: "expandedByDefault", type: "boolean", description: "Whether the first section should be expanded on initial render", default: false)

This level of detail in the schemas may allow the system to accurately extract and map values from the design to the component, preserving the designer's intent while adapting it to the constraints and capabilities of the target component system.

In an example use case, consider the e-commerce product page design from the previous example where the user has reviewed the consolidated recommendations and selected specific matches for each of the 8 segmented components. In 602, the system may receive source and target selections through the user interface, where the user has chosen the original "navigation-bar" segment as the source and selected the "sticky-navigation-with-search" component template as the target, along with pairing the "product-gallery" segment with the "product-image-carousel-with-thumbnails" template, and matching the "customer-reviews" segment with a "testimonial-card-grid" component. The system may store these 8 source-target pairs in memory, creating a mapping structure that associates each segmented node with its corresponding selected component or template. In 604, the system may retrieve specialized tools from the Tool Configuration database based on these selections, loading a navigation component processor for handling search functionality and cart integration, a carousel tool optimized for product image galleries with thumbnail navigation, and a testimonial processing tool designed to extract customer review data and ratings from design layouts.

Moving through the extraction and mapping process, in 606, the system may parse the original UX design file to extract JSON representations for each selected source node, isolating the navigation segment's JSON data that includes properties for logo positioning, search bar dimensions, cart icon styling, and menu item hierarchies, while extracting the product gallery segment's JSON containing image grid layouts, thumbnail arrangements, and zoom interaction specifications. In 608, the system may retrieve detailed prop schemas from the schema storage for each selected target component, obtaining the "sticky-navigation-with-search" schema that defines props such as "logoUrl" (string), "searchPlaceholder" (string), "cartItemCount" (number), and "menuItems" (array of objects), along with the "product-image-carousel-with-thumbnails" schema specifying props like "mainImages" (array of URLs), "thumbnailSize" (string), and "zoomEnabled" (boolean). In 610 and 612, the LLM may analyze the extracted JSON data against these schemas to intelligently map design elements to component properties, identifying the company logo image as the "logoUrl" value, extracting "Search products . . . " text as the "searchPlaceholder", and mapping the product image array to the "mainImages" prop, before populating the complete schemas with these extracted values and returning them to the user interface for final review and approval, enabling the designer to verify that product images, navigation elements, and customer review data have been accurately mapped to their corresponding component properties.

FIG. 7 illustrates a flowchart of a method 700 for converting design content to a target system format. The method 700 includes defining target structure 702, aggregating target structures 704, converting to target CMS format 706, transmitting converted content 708, persisting content 710, generating content ID 712, and creating webpage preview 714.

In 702, the system may define the target structure using populated schemas and manifests. The system may analyze the component schemas that have been populated with extracted data from the logical nodes. The system may utilize manifest files, which are structured configuration documents that define the overall architecture, component relationships, and rendering rules of the target CMS. These manifest files may contain detailed specifications including component placement constraints, parent-child hierarchies, allowed component combinations, and content validation rules. For example, the manifest may specify that a "hero" component must appear at the top of a page template, can only contain specific child components, and requires certain mandatory fields to be populated. The system interprets these manifest specifications to determine how the populated schemas should be organized and positioned within the target CMS structure, ensuring compliance with the target system's architectural requirements and content modeling constraints.

The system may also resolve any dependencies or relationships between components at this stage. For instance, if a "product card" component is nested within a "product grid" component, the system may define the target structure to reflect this hierarchy.

In 704, the system may aggregate target structures across selected components. The system may combine the individual target structures defined for each component into a cohesive overall structure. In some cases, this may involve merging multiple component structures into larger composite structures. For example, the system may aggregate a header structure, main content area structure, and footer structure into a single page-level structure.

The system may also resolve any conflicts or overlaps between component structures during this aggregation process. In some cases, the system may apply rules or priorities to determine how conflicting structures are to be merged or which structure is to take precedence.

In 706, the system may convert the aggregated structure to a target CMS format. The system may transform the internal representation of the aggregated structure into the specific format of the target CMS. This conversion process may involve translating data structures, reformatting content, and generating any metadata or configuration files.

For example, if the target CMS uses a particular JSON schema for page definitions, the system may convert the aggregated structure into that specific JSON format, transforming the internal representation into a format compatible with the target CMS's content models and component architecture. The conversion process may involve translating data structures, reformatting content, and generating any required metadata or configuration files. The system utilizes manifest files that define the overall architecture, component relationships, and rendering rules of the target CMS to ensure the converted content complies with the target system's requirements. In some cases, the system may also generate additional files or code of the target CMS, such as CSS stylesheets or JavaScript modules, or template configurations that control how the components are rendered in the final webpage.

In 708, the system may transmit the converted content to the target system. The system may use appropriate network protocols and APIs to send the converted content to the target CMS. In some cases, this may involve authenticating with the target system, initiating a content upload process, and handling any responses or errors from the target system.

The system may also perform validation checks before or during transmission to ensure the converted content meets any requirements or constraints of the target system. For example, the system may verify that fields are populated and that content sizes are within acceptable limits.

In 710, the system may persist the content in the target system. The system may interact with the target CMS's storage mechanisms to save the transmitted content in a permanent or semi-permanent state. This may involve creating new database records, updating existing content entries, or generating static files, depending on the architecture of the target CMS.

In some cases, the system may also handle versioning or content staging processes as part of the persistence step. For example, the system may create a draft version of the content that can be reviewed and approved before being published to a live environment.

In 712, the system may generate a content ID for preview. The system may create a unique identifier for the newly persisted content that can be used to retrieve and display the content for preview purposes. In some cases, this content ID may be a database key, a URL slug, or a combination of identifiers that uniquely specify the location and version of the content within the target CMS.

The system may also generate any preview tokens or temporary access credentials that allow the content to be viewed in a preview state before final publication.

In 714, the system may create a final webpage preview for user review. The system may use the generated content ID to retrieve the persisted content from the target CMS and render it as it may appear in its final published form. This preview generation may involve applying any templates, styles, or dynamic functionality to present a fully-functional representation of the webpage.

In some cases, the system may generate multiple preview versions to show how the content may appear on different devices or in different contexts. For example, the system may create desktop, tablet, and mobile previews of the webpage. The system may then present this preview to the user through an appropriate interface, allowing for final review and approval before the content is published or further modified. This preview step may serve as a quality assurance checkpoint in the automated content authoring workflow. Upon receiving user approval through the interface, the system may initiate the deployment process by transitioning the content from draft or staging status to a published state within the target CMS. The system may execute deployment workflows that may include updating content visibility settings, activating the webpage URL, integrating the new content with existing site navigation structures, and triggering any cache invalidation or content delivery network updates to ensure the webpage becomes accessible to end users. In some cases, the system may also perform post-deployment verification checks to confirm that the webpage renders correctly in the live environment and that interactive elements function as intended, while generating deployment logs and notifications to inform relevant stakeholders of the successful publication.

In an example use case continuing from the e-commerce product page design example, the system may proceed through the conversion and deployment process using the populated schemas from the previous steps. In 702, the system may define the target structure by analyzing the populated schemas for the eight selected components, including the "sticky-navigation-with-search" component with its populated props like logoUrl and searchPlaceholder, and the "product-image-carousel-with-thumbnails" component with its mainImages array and thumbnailSize specifications. The system may consult the target CMS manifest file to determine that the navigation component may be positioned in the header section, the product gallery may occupy the main content area, and the testimonial cards may be arranged in a grid layout within the reviews section. The system may also resolve component dependencies, such as ensuring that the product gallery component's image URLs are properly linked to the content delivery network and that the navigation component's cart functionality integrates with the e-commerce backend systems.

Moving through the final conversion steps, in 704, the system may aggregate eight component structures into a cohesive page-level structure that maintains the original design hierarchy, combining the header navigation, hero section, product details, image gallery, feature comparison table, customer testimonials, related products carousel, and footer into a unified page definition. In 706 and 708, the system may convert this aggregated structure into the target CMS's specific JSON format and transmit it via the CMS API, including component configurations, styling parameters, and content data. In 710, the system may persist the converted content to the target CMS database, creating a new product page entry with draft status and linking associated media assets and component configurations. Finally, in 712 and 714, the system may generate a unique content ID such as "product-page-draft-12345" and create comprehensive webpage previews showing how the e-commerce product page will appear across desktop, tablet, and mobile viewports, displaying the fully functional navigation with search capabilities, interactive product image carousel with thumbnail navigation, and customer review cards with star ratings, allowing the designer to verify that original design elements have been accurately translated into a working webpage before final publication.

As described in the figures above, the overall process effectively transforms a UX design into a fully functional webpage through a series of automated steps leveraging artificial intelligence and machine learning technologies. The system receives a UX design file from a web-page design tool and uses LLMs to segment the design into logical nodes representing distinct components such as headers, navigation menus, content sections, and footers. Each logical node is converted into standardized image representations, and multimodal RAG systems perform similarity searches against a database of existing reusable content blocks, design components, and templates. Through this process, the system identifies matching components and employs LLMs to extract relevant data from the design nodes, mapping this extracted information to component schemas that define the customizable attributes and properties of each identified component. The system then converts the populated schemas into a target CMS format, persists the content to the target system, and generates a preview of the resulting webpage.

Figure 8:
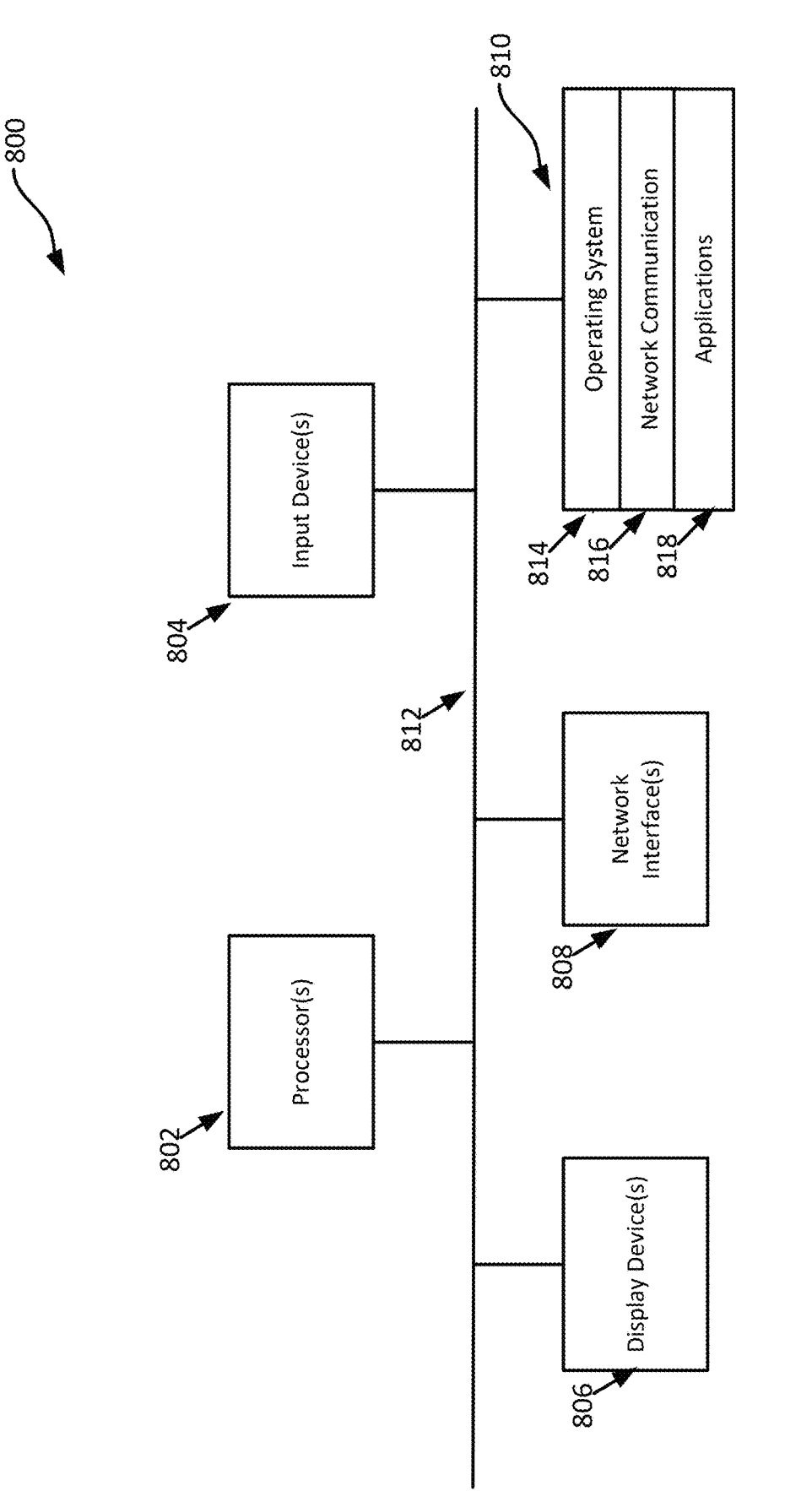
FIG. 8 illustrates a block diagram of a computing system, according to aspects of the present disclosure.

FIG. 8 illustrates a block diagram of a computing system 800 that may implement the automated web content authoring system. The computing system 800 may include a processor 802, an input device 804, a display device 806, a network interface 808, a software stack 810, and a system bus 812.

In some cases, the processor 802 may execute instructions and process data for the computing system 800. The processor 802 may be a central processing unit (CPU), a graphics processing unit (GPU), or any other suitable processing device. The processor 802 may be configured to execute the methods described in the previous figures, such as the design segmentation, node identification, data extraction and mapping, and content generation processes.

The input device 804 may receive user inputs and provide them to the processor 802. In some cases, the input device 804 may be a keyboard, mouse, touchscreen, microphone, or any other device capable of receiving user input. For example, a user may input a web-page design tool URL or select reusable content blocks through the input device 804.

The display device 806 may present visual output to users. In some cases, the display device 806 may be a monitor, LCD screen, or any other suitable display technology. The display device 806 may be used to show the user interface for the automated web content authoring system, including displaying segmented nodes, recommended components, and final webpage previews.

The network interface 808 may enable communication between the computing system 800 and external networks or devices. In some cases, the network interface 808 may be an Ethernet adapter, Wi-Fi module, or cellular modem. The network interface 808 may allow the computing system 800 to communicate with design tools, CMSs, and other networked resources for the web content authoring process.

The software stack 810 may comprise multiple software layers that work together to implement the automated web content authoring system. The software stack 810 may include an operating system 814, a network communication module 816, and an application module 818.

The operating system 814 may manage hardware resources and provide services to other software components. In some cases, the operating system 814 may be Windows, Linux, macOS, or any other suitable operating system. The operating system 814 may handle tasks such as memory management, process scheduling, and device drivers, which are beneficial for the smooth operation of the web content authoring system.

The network communication module 816 may handle network-related operations and communications. In some cases, the network communication module 816 may implement protocols such as HTTP, HTTPS, and WebSocket to facilitate communication with design tools, CMSs, and other networked resources. The network communication module 816 may be responsible for sending and receiving data, such as UX design files, component schemas, and generated web content.

The application module 818 may provide application functionality for the computing system 800. In some cases, the application module 818 may implement the core logic of the automated web content authoring system, including the design segmentation algorithms, multimodal RAG systems, and LLM-based data extraction and mapping processes. The application module 818 may interact with other components of the software stack and hardware components to execute the methods described in the previous figures.

The system bus 812 may facilitate communication between the various hardware components and the software stack 810. In some cases, the system bus 812 may be a high-speed data bus that allows data and control signals to be exchanged between the components of computing system 800. The system bus 812 may enable the processor 802 to access data from the input device 804, send display information to the display device 806, and communicate with the network interface 808 and software stack 810.

In a specific use case, the computing system 800 may receive a web-page design tool URL through the input device 804. The processor 802 may execute instructions from the application module 818 to segment the design using the LLM. The network interface 808 may then be used to retrieve matching components from a remote database. The processor 802 may perform data extraction and mapping, with results displayed on the display device 806. Finally, the generated web content may be sent to a target CMS through the network interface 808, utilizing the network communication module 816 for secure data transfer.

While the foregoing is directed to example embodiments described herein, other and further example embodiments may be devised without departing from the basic scope thereof. For example, aspects of the present disclosure (e.g., modules) may be implemented in hardware or software or a combination of hardware and software. One example embodiment described herein may be implemented as a program product for use with a computer system. The program(s) of the program product defines functions of the example embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed example embodiments, are example embodiments of the present disclosure.

It will be appreciated by those skilled in the art that the preceding examples are not limiting. It is intended that permutations, enhancements, equivalents, and improvements thereto are apparent to those skilled in the art upon a reading of the specification and a study of the drawings are included within the true spirit and scope of the present disclosure. It is therefore intended that the following appended claims include such modifications, permutations, and equivalents as fall within the true spirit and scope of these teachings.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method for automating web content authoring workflow, comprising:
   receiving a user experience (UX) design file from a design tool;
   segmenting the UX design file into a plurality of logical nodes using a large language model (LLM), wherein each logical node represents a distinct component of the UX design;
   converting each logical node into an image representation;
   performing image similarity searches using multimodal retrieval-augmented generation (RAG) systems, wherein performing the image similarity searches comprises converting each image representation into an image embedding and calculating similarity scores between the image embedding and embeddings stored in a database to identify matching reusable content blocks, design components, and templates from the database;
   retrieving component schemas corresponding to the identified matching reusable content blocks, design components, and templates, wherein the component schemas define customizable attributes for the identified matches;
   extracting data from the logical nodes and mapping the extracted data to the retrieved component schemas using the LLM, wherein the mapping populates the customizable attributes with values extracted from the UX design file; and
   generating web content, the generating comprising converting the populated component schemas into a target content management system format, transmitting the web content to a target content management system, and persisting the web content to generate a webpage.

2. The method of claim 1, wherein the UX design file comprises a JSON representation of design nodes.

3. The method of claim 1, further comprising:
   segmenting the UX design file by providing the LLM with instructions to identify logical segments based on naming conventions, dimensions, relative positioning, and sibling node relationships.

4. The method of claim 3, further comprising: returning, by the LLM, node identifiers for each identified logical segment.

5. The method of claim 1, further comprising:
   converting each logical node into the image representation by preprocessing the images using OpenCV libraries to perform resizing and masking operations.

6. The method of claim 5, further comprising: removing, by the masking operations, image portions to increase resemblance to base component template images.

7. The method of claim 1, wherein the image embeddings are created from images of existing reusable content blocks, the design components, and the templates stored in the database.

8. The method of claim 1, further comprising:
   recursively processing, by the extracting data and mapping, nested child components within the logical nodes to populate values for child component attributes.

9. The method of claim 1, wherein the component schemas comprise details of the customizable attributes including name, type, description, and possible values for internal attributes and dynamic child components.

10. A system for automating web content authoring workflow, comprising:
    a processor;
    a large language model (LLM);
    a user interface; and
    a memory storing instructions that, when executed by the processor, cause the system to:
      receive a user experience (UX) design file from a design tool;
      segment the UX design file into a plurality of logical nodes using the LLM, wherein each logical node represents a distinct component of the UX design;
      convert each logical node into an image representation;
      perform image similarity searches using multimodal retrieval-augmented generation (RAG) systems, wherein performing the image similarity searches comprises converting each image representation into an image embedding and calculating similarity scores between the image embedding and embeddings stored in a database to identify matching reusable content blocks design components, and templates from the database;
      retrieve component schemas corresponding to the identified matching reusable content blocks, design components, and templates, wherein the component schemas define customizable attributes for the identified matches;
      extract data from the logical nodes and map the extracted data to the retrieved component schemas using the LLM, wherein the mapping populates the customizable attributes with values extracted from the UX design file; and
      generate web content by performing processing comprising converting the populated component schemas into a target content management system format, transmitting the web content to a target content management system, and persisting the web content to generate a webpage.

11. The system of claim 10, wherein the UX design file comprises a JSON representation of design nodes.

12. The system of claim 10, wherein the system is further configured to:

segment the UX design file by providing the LLM with instructions to identify logical segments based on naming conventions, dimensions, relative positioning, and sibling node relationships.

13. The system of claim 12, wherein the system is further configured to:

return, by the LLM, node identifiers for each identified logical segment.

14. The system of claim 10, wherein the system is further configured to:

convert each logical node into the image representation by preprocessing the images using OpenCV libraries to perform resizing and masking operations.

15. The system of claim 14, wherein the system is further configured to:

remove, by the masking operations, image portions to increase resemblance to base component template images.

16. The system of claim 10, wherein the image embeddings are created from images of existing reusable content blocks, the design components, and the templates stored in the database.

17. The system of claim 10, wherein the system is further configured to:

recursively process, by the extracting data and mapping, nested child components within the logical nodes to populate values for child component attributes.

18. The system of claim 10, wherein the component schemas comprise details of the customizable attributes including name, type, description, and possible values for internal attributes and dynamic child components.

* * * * *